United States Patent
Woronowicz et al.

(10) Patent No.: US 11,750,034 B2
(45) Date of Patent: Sep. 5, 2023

(54) INDUCTIVE POWER TRANSFER WITH REDUCED ELECTROMAGNETIC INTERACTIONS WITHIN A CONDUCTOR ARRANGEMENT

(71) Applicant: Bombardier Primove GmbH, Berlin (DE)

(72) Inventors: Konrad Woronowicz, Kingston (CA); Robert Czainski, Zelona Góra (PL)

(73) Assignee: Bombardier Primove GmbH, Berlin (DE)

( * ) Notice: Subject to any disclaimer, the term of this patent is extended or adjusted under 35 U.S.C. 154(b) by 58 days.

(21) Appl. No.: 17/312,823

(22) PCT Filed: Dec. 19, 2019

(86) PCT No.: PCT/EP2019/086204
§ 371 (c)(1),
(2) Date: Jun. 10, 2021

(87) PCT Pub. No.: WO2020/127662
PCT Pub. Date: Jun. 25, 2020

(65) Prior Publication Data
US 2022/0060052 A1 Feb. 24, 2022

(30) Foreign Application Priority Data
Dec. 21, 2018 (GB) .................................... 1821029

(51) Int. Cl.
*H02J 50/12* (2016.01)
*H02J 50/70* (2016.01)
(Continued)

(52) U.S. Cl.
CPC .............. *H02J 50/12* (2016.02); *B60L 53/12* (2019.02); *H02J 50/005* (2020.01); *H02J 50/402* (2020.01); *H02J 50/70* (2016.02)

(58) Field of Classification Search
CPC .. H02J 50/12; H02J 50/70; H02J 50/00; H02J 50/40; B60L 53/12; H01F 41/071; H01F 2041/0711; H01F 41/069
See application file for complete search history.

(56) References Cited

U.S. PATENT DOCUMENTS 6,499,701 B1 * 12/2002 Thornton ................ B60L 5/005
246/194
2012/0055751 A1 * 3/2012 Vollenwyder ........... B60L 5/005
191/10
(Continued)

FOREIGN PATENT DOCUMENTS

CA 3038710 A1 6/2018
EP 2841293 B1 10/2013
(Continued)

OTHER PUBLICATIONS

International Search Report and Written Opinion dated Jun. 15, 2020, in connection with PCT/EP2019/086204 filed Dec. 19, 2019.

*Primary Examiner* — Rexford N Barnie
*Assistant Examiner* — Joseph N Inge
(74) *Attorney, Agent, or Firm* — Downs Rachlin Martin PLLC

(57) ABSTRACT

A conductor arrangement for an inductive power transfer, the conductor arrangement comprising at least three coils arranged along a longitudinal axis and formed of at least one conductor; and at least two winding heads arranged opposite one another and in which conductor sections of each coil extend along one another and along the longitudinal axis; wherein, within at least one of the winding heads, the conductor sections of the first and second coils that extend along the longitudinal axis are arranged at a first distance to one another, the first distance ≥zero, and the conductor section of the third coil that extends along the longitudinal axis is arranged at second distances to said conductor (Continued)

sections of the first and second coils, the second distances being larger than the first distance. Also disclosed are an inductive power transfer arrangement and methods for providing conductor arrangements for an inductive power transfer.

19 Claims, 3 Drawing Sheets

(51) Int. Cl.
    *B60L 53/12*     (2019.01)
    *H02J 50/00*     (2016.01)
    *H02J 50/40*     (2016.01)

(56) References Cited

U.S. PATENT DOCUMENTS

| | | | | |
|---|---|---|---|---|
| 2013/0328412 | A1* | 12/2013 | Meins | B60L 53/122 307/104 |
| 2014/0318912 | A1* | 10/2014 | Woronowicz | B60M 7/003 191/10 |
| 2015/0075934 | A1* | 3/2015 | Czainski | H02J 50/10 191/10 |
| 2016/0090275 | A1* | 3/2016 | Piech | B66B 9/02 187/250 |
| 2018/0363806 | A1* | 12/2018 | Leininger | B60M 7/00 |
| 2019/0272943 | A1* | 9/2019 | Leem | H02J 50/80 |

FOREIGN PATENT DOCUMENTS

| | | | | |
|---|---|---|---|---|
| EP | 2928039 | A1 | 10/2015 | |
| GB | 2507533 | A | 7/2014 | |
| GB | 2539885 | A | 1/2017 | |
| JP | 2013184586 | A * | 9/2013 | ............ B60L 5/005 |
| WO | 2013133254 | A1 | 9/2013 | |
| WO | WO-2013133254 | A1 * | 9/2013 | ............ B60L 5/005 |
| WO | WO-2014072373 | A1 * | 5/2014 | ............ B60L 5/005 |
| WO | 2018080049 | A1 | 5/2018 | |
| WO | WO-2018080049 | A1 * | 5/2018 | ......... H01F 27/2885 |

* cited by examiner

INDUCTIVE POWER TRANSFER WITH REDUCED ELECTROMAGNETIC INTERACTIONS WITHIN A CONDUCTOR ARRANGEMENT

The invention relates to conductor arrangements, inductive power transfer arrangements and to methods for an inductive power transfer and in particular for an inductive power transfer with reduced electromagnetic interactions. The invention relates in particular to the field of inductive power transfer to vehicles. The vehicle can be a land vehicle, such as a road vehicle (e.g. a car, truck or bus) or a track-bound vehicle, such as a train or tram.

Electric vehicles, in particular a track-bound vehicle and/or a road vehicle, can be operated and in particular propulsed by electric energy which is transferred by means of an inductive power transfer. Such a vehicle may comprise a circuit arrangement which can be a traction system or a part of a traction system of the vehicle comprising a receiving device adapted to receive an alternating electromagnetic field and to produce an alternating electric current by electromagnetic induction. Furthermore, such a vehicle can comprise a rectifier adapted to convert an alternating current to a direct current. The direct current can be used to charge a traction battery or to operate an electric machine. In the latter case, the direct current can be converted into an alternating current by means of an inverter.

The inductive power transfer is performed using two sets of e.g. three-phase windings. A first set is installed on the ground (primary windings) and can be fed by a wayside power converter (WPC). The second set of windings (secondary windings) is installed on the vehicle. For example, the second set of windings can be attached underneath the vehicle, in the case of trams under some of its wagons. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

Each of the first and second windings represent a conductor arrangement that can be formed of a plurality of coils. Each conductor arrangement and especially each coil can be formed of an electric conductor (e.g. a cable) which may also be referred to as a phase line.

Due to presence of a large clearance between the primary windings and the secondary windings, the operational behaviour of the formed transformer is different than the behaviour of conventional transformers which have a closed magnetic core with negligible or small air gaps. The large air gap results in smaller mutual inductive coupling and larger leakage inductances.

The leakage inductance usually acts as a series inductance with each coil of a respective conductor arrangement. To be able to transfer high power levels, it is necessary to use an adequate capacitance in order to compensate the reactance of the inductors at an operating frequency of e.g. kHz. With respect to the secondary side of the high frequency transformer, the combination of the inductance(s), which can comprise the main or mutual inductance and/or the leakage inductance, and the capacitance(s), which can comprise the compensating capacitance, forms a resonant circuit. A perfect impedance cancellation happens if impedance values of the inductance(s) and the capacitance(s) are chosen such that the natural resonance frequency of the resonant circuit is equal to the operating frequency. Such a resonant circuit is said to be tuned. Examples of respectively tuned circuits can e.g. be found in the applicant's earlier disclosure GB 2507533 A.

In case a plurality of coils is present within a conductor arrangement, which may each comprise respective compensating capacitances, it is generally desired that each coil forms a tuned resonant circuit. Specifically, said coils should be tuned to same operating frequency or, more generally, should be operable at a common working point.

First of all, this may be difficult to achieve due to electromagnetic interactions between the coils, said coils being typically arranged close to one another within the conductor arrangement. Note that such electromagnetic interactions may in particular relate to and/or result in differences in the inductances of the coils due to the magnetic fields of the coils affecting each other.

Moreover, due to temperature changes and/or aging, a tolerance of a compensating capacitance can increase and thus change a resonance frequency of the resonant circuits formed by each coil. In particular when the coils differ from one another, e.g. in terms of compensating capacitances in each circuit, this may result in different effects on the resonant behavior of each circuit and thus to a detuning of the resonant circuits. In consequence, the changed resonant frequencies may not correspond to the operating frequency as well as to the resonant frequencies of the further circuits anymore. Such a detuning deviates the overall performance and power transfer capability of the inductive power transfer system. Also, an impedance of the secondary side reflected to the primary side of the transformer can become capacitive. This can result in a leading current with respect to the voltage in the WPC which is highly unwanted because a leading current eliminates soft switching conditions of semiconductor switches and increases their power losses considerably. Under such operation conditions, a WPC can overheat and turn off which, in turn, interrupts the needed power transfer.

An object of the present invention is thus to improve the operability of a primary or secondary conductor arrangement in particular with regard to achieving a desired resonant behaviour.

This object is solved by the subject-matters defined in the attached independent claims. Advantageous embodiments are defined in the dependent claims. Note that the features mentioned in the above introductory part of this description may individually or in any combination thereof also be provided in the presently disclosed solution, if not mentioned or evident otherwise.

According to basic idea of the invention, solutions are suggested for limiting undesired electromagnetic interactions between coils of a conductor arrangement, said conductor arrangement being used for an inductive power transfer. Differently put, the invention enables an at least partial electromagnetic decoupling of at least some of the coils. Thus, the inductances of the coils can be maintained at similar levels. This way, similar operating points and resonant frequencies of the circuits can be achieved.

Also, the inventors have observed that the above-mentioned detuning is particularly counter-productive in view of the electromagnetic interactions between the coils of a conductor arrangement. Specifically, in case one coil experiences a comparably strong detuning, this may affect other coils by way of electromagnetic interactions, thereby leading to a further detuning of the overall conductor arrangement. Again, this may be limited or even prevented due to limiting said interactions with help of the invention.

The decoupling may be achieved by increasing the magnetic permeability in the surroundings of at least one of the coils, such that an electromagnetic field produced by said coil can be concentrated close thereto and/or can be guided in a desired manner e.g. so as to limit effects on the further coils. For example, the electromagnetic field and in particular its magnetic flux may be kept close to the coil from which it originates by producing closed field lines of limited lengths.

Alternatively, this may be done by decreasing the magnetic permeability in the surroundings of a coil (e.g. by way of providing significant air gaps), thereby limiting the extent to which a magnetic flux of said coil may affect adjacent coils (e.g. by not being easily forwarded thereto or, differently put, not reaching it). For example, a distance of a coil to further coils may be locally increased in at least one direction. According to some embodiments, this distance can be used for positioning a magnetisable material in the resulting gap for achieving the increase of magnetic permeability mentioned above. This way, undesired interactions can be prevented particularly reliable by combining the advantages of both of the above permeability-strategies.

Note that the magnetic permeability may in this context be understood as the ability of a coil's surrounding to support the formation and/or expansion of a magnetic field originating from the respectively adjacent coil.

By thus limiting the electromagnetic interactions between the coils, the risk of detuning may be limited and it may generally be easier to maintain a common working point for all coils. In particular, the risk of an uncontrollable detuning of any of the coils as soon as one coil experiences ageing or temperature impacts may be limited.

It has further been discovered that introducing the above-mentioned measures is particularly effective in the so-called winding heads e.g. due to the closeness of the coils in these regions. Also, the magnetic flux in the winding heads may be larger by e.g. a factor of 3 to 5 than in a central portion of the conductor arrangement (i.e. in a portion containing the active sections discussed below). This may result from a higher concentration of ferrites or other magnetisable materials at the winding head, e.g. due to providing known electromagnetic shielding assemblies in this region. Thus, limiting detuning can be particularly well achieved when providing the inventive measures for electromagnetically decoupling the coils from one another in the region of a winding head.

In more detail, a conductor arrangement for an inductive power transfer is suggested (e.g. for an inductive power transfer to a land vehicle, such as a train or road vehicle). The conductor arrangement comprises at least three coils that are arranged (e.g. next to one another) along a longitudinal axis and that are formed of at least one conductor (preferably each coil being formed by one individual conductor),
wherein the conductor arrangement comprises at least two winding heads that are arranged opposite to one another and in which conductor sections of each of the coils extend along one another as well as along the longitudinal axis,
wherein, within at least one of the two (or in each) winding head, the conductor sections of a first and second coil that extend along the longitudinal axis are arranged at a first distance to one another, the first distance being equal to or larger than zero, and the conductor section of the third coil that extends along the longitudinal axis is arranged at second distances to the further conductor sections (i.e. to the conductor sections of the first and second coil that extend along the longitudinal axis), the second distances being larger than the first distance.

Differently put, the conductor sections of the first and second coil are positioned closer to one another than to the conductor section of the third coil. The second distances may be equivalent to one another and are generally different from zero. If referring to only one second distance in singular form in the following, this may relate to both second distances, if not evident or mentioned otherwise. As an alternative to defining two second distances, a second distance could be defined that relates to the distance between the first and third coil and a third distance could relate to a distance between the second and third coil, these distances again being larger than the first distance.

Differently put, two of the conductor sections (those of the first and second coil) may be positioned close to one another or even at the same position along a defined axis (first distance), whereas the further conductor section (of the third coil) is positioned as a, compared to the first distance, large distance thereto. Note that the distance of said further conductor section to any of the conductor sections of the first and second coil may be larger than said first distance.

The second distances may amount to at least 1.5 times the first distance or at least two, at least, at least five, at least ten or up to twenty times the first distance. Additionally or alternatively, the first distance may be less than 10%, less than 5% or less than 2% of the length of the longitudinal sections of the coils within the winding heads and the second distances may be larger than that (e. g. 1.5 times said first distance).

In general, the first and second distances may be chosen so that comparable properties of the coils are achieved (e.g. by limiting undesired interactions accordingly). Such properties may be an inductance, a resonant behavior, an amplitude and/or frequency of induced currents or the like. In this context, the coil having the lager seconds distances to the remaining ones may be a coil that is exposed to the most and/or largest interactions with the other coils, e.g. by being positioned therebetween (see below).

Note that in this disclosure, if referring to conductor sections of the coils and in particular to the coil's conductor sections within the winding head, this may generally concern the conductor sections that extend along the longitudinal axis, even though this might not be specifically mentioned in each of the following cases. Accordingly, lateral conductor sections that might be included in or at least lead up to a winding head may not be considered when referring to conductor sections within the winding head below.

Moreover, an extension of such conductor sections along the longitudinal axis is not (but could optionally be) limited to a straight extension in parallel to said axis. Rather, a conductor section may be considered as extending along said axis as long as one (e.g. vectorial) direction component of its extension and preferably the dominant one extends along said axis. This concerns e.g. oval coils or generally curved extensions of a conductor section within the winding head. Thus, a conductor section may be considered to extend along the longitudinal axis as long as it does not extend (or only extends to a lesser or less dominant degree) along a lateral axis extending orthogonally to the longitudinal axis. Likewise, any conductor section may be considered to extend along the longitudinal axis when it connects two conductor sections and/or two regions of a coil that are spaced apart from one another along the longitudinal axis. This may even be valid regardless of the exact course or extension of the conductor section extending between the sections or regions to be connected.

A winding head may generally be a region in which the direction of extension of a coil is reversed e.g. when viewed in a winding direction. For example, a conductor may enter a winding head running upwards and leave the winding head running downwards towards the opposite winding head.

The coils may also be referred to as phase windings or as poles of the conductor arrangement. In general, a coil may comprise at least one fully or largely closed loop or winding formed by a conductor. For example, an opening angle of the loop or coil may be equal to or less than 90°, thus been largely closed. The coil may comprise a plurality of fully or largely closed turns (e.g. at least two per coil). Opening angles or sections of said turns may be positioned so as to not overlap one another (e.g. by being positioned at different and preferably opposite sides of the coil).

The coils may be formed by a conductor. Preferably, at least some and preferably all of the coils are formed by an individual conductor (i.e. one conductor per coil). The conductor may also be referred to as a phase line and/or may be a cable. In general, each coil may generate (secondary side) or be operated by (primary side) one phase of an alternating three-phase current.

The conductor arrangement has a longitudinal axis and preferably a lateral axis extending at an angle and e.g. orthogonally to said longitudinal axis. Both axes may extend within or parallel to a plane in which at least one of the coils is formed. Note that "a plane in which a coil is formed" may relate to any main or major plane in which a coil is formed, e.g. a plane including at least 50% of the area covered or enclosed by a coil and/or including at least 50% of the conductor's length of said coil. Additionally or alternatively, the above quoted expression may relate to a plane of the coil that extends between the winding heads and/or that includes the active sections of a coil as discussed in further detail below.

The coils may be arranged next to one another along the longitudinal axis (e.g. when viewing the conductor arrangement along said longitudinal axis) or, differently put, may be displaced relative to one another along the longitudinal axis. This may include a distance, pitch or space being present between at least some of the coils. Preferably, however, the coils at least partially overlap one another, such that being arranged next one another along the longitudinal axis may include also partial overlaps as long as when viewed along said axis, a sequence of the coils is apparent. Preferably, no respective displacement of the coils is present along the lateral axis.

In general, the centres of the coils (e.g. geometric centres and/or centre of the area enclosed by a coil) may be arranged next to one another along the longitudinal axis but preferably with a distance therebetween. Said distance may amount to a least a quarter of the dimension of at least one of two adjacent coils along the longitudinal axis and e.g. to about half or third of said dimension. Moreover, the respective centres are preferably arranged along a common straight line which is preferably congruent to or extends along the longitudinal axis.

Each coil may be shaped in a rectangular or oval manner and preferably the coils each have the same dimensions and/or shapes. Each coil may have two pairs of sections being arranged opposite and/or parallel to one another, one pair being part of the windings heads and the other being so-called active sections. Additionally or alternatively, each coil may have two (in comparison) longer and two (in comparison) shorter sections, said longer sections extending preferably opposite and/or in parallel to one another, the same preferably applying to the shorter sections as well. The longer sections may be the active sections and the shorter sections may be part of the winding heads.

The active sections of a coil may define or dominate the characteristics of a coil with regard to the inductive power transfer. Additionally or alternatively, the active sections may be configured to, during the inductive power transfer, produce a resonating electromagnetic field by interacting (and/or cooperating) with a further conductor arrangement (that is e.g. positioned in the respective other of a primary and secondary side). In general, the active sections may be formed by or provide at least part of the longer sections of a coil and/or of so-called pole legs of a coil. The active sections may extend along a lateral axis of the conductor arrangement and/or be connected by further (shorter winding head) sections that extend along the longitudinal axis of the conductor arrangement.

To sum up, each coil may thus have sections or segments extending along and/or in parallel to one of a longitudinal axis and lateral axis (in particular two sections along the longitudinal and two sections along the lateral axis). The sections extending parallel to the lateral axis can also be referred to as active sections. The lateral axis extends preferably orthogonally to and crosses the longitudinal axis.

The coils may be provided as substantially flat structures. Accordingly, they may be arranged within and/or in parallel to a common two-dimensional plane. Said plane may comprise the above-mentioned lateral and longitudinal axes of the conductor arrangement. It is to be understood that if extending within a common plane, said plane may have a limited thickness which may e.g. be defined by a thickness of the conductors (e.g. a diameter thereof). On the other hand, at least at a position of an overlap, stacking or crossing between two coils, the thickness of the plane may be defined by a respective multiple of the thickness of the conductors or their diameters, e.g. since at a respective crossing a plurality of conductor sections are placed on top of one another.

According to known solutions, at least part of the conductor sections of a coil forming a winding head may be placed at different (e.g. vertical) heights than those conductor sections which form the active sections of said coil. For example, these different conductor sections may be angled relative to one another. In this case, the plane in which the coils are formed may have a thickness so as to comprise both height levels or, as noted above, may relate to a (main) plane that extends between the winding heads and thus comprises the active sections.

In general, the lateral and longitudinal axes can both be oriented perpendicular to a vertical axis, said vertical axis being preferably oriented towards the other of a first and secondary side and/or extending in parallel to a main direction of the power transfer. Also, said vertical axis may be oriented along the direction of gravitational forces, but is preferably oriented oppositely thereto. Directional terms used in the present disclosure referring to a direction such as "above", "under", "beside" or their respective equivalents can relate to the aforementioned longitudinal, lateral and vertical axes.

Note that references to the first, second and third coil are generally interchangeable if not mentioned or evident otherwise (i.e. the terms first, second and third not defining a distinct order). Yet, in a preferred embodiment, one of said coils is positioned between the others along the longitudinal axis, namely the third coil that is arranged at the larger distance to the other ones.

More precisely, according to one embodiment of the arrangements and methods, the third coil is arranged at least partially between the first and second coil when viewed along the longitudinal axis. This is beneficial in that said (central) coil is likely to be affected the most by electromagnetic interactions with further (outer) coils. Therefore, it is particularly advantageous to decouple said central coil from the outer coils by way of the inventive measures, since the overall electromagnetic interactions within the conductor arrangement can then be significantly decreased.

Generally, the first and second distances can be measured along any (common) axis and, according to the below embodiments, in particular along a vertical axis or a horizontal (e.g. lateral) axis.

Specifically, according to one aspect of the arrangements and methods, the first distance and the second distances extend along an axis that is parallel to a plane in which at least one of the coils are formed. Said plane may be a main plane as discussed above. Also, said plane may be a horizontal plane extending orthogonally to a vertical (spatial) axis. The axis along which the distances are measured, on the other hand, can be a lateral axis as discussed above. Thus, according to this embodiment, a horizontal displacement of the coils may be provided.

Accordingly, along said axis and within the winding heads, two of the coils or their conductor sections, respectively, can be arranged at preferably the same position (e.g. at the same lateral position), whereas the conductor section of the third coil can be arranged at a different lateral position compared to the other conductor sections. In particular, said different lateral position may, with respect to a geometric centre of the conductor arrangement, be located more inwardly and/or more closely to said geometric centre.

For example, the conductor sections of the first and second coil may form outer sections of the winding head, whereas the conductor sections of the third coil may form an inner conductor section. Said inner conductor section may e.g. face the opposite winding head or, differently put, is located closer thereto than said outer sections.

In this context, the third coil may have a reduced lateral dimension (or, differently put, a reduced height) compared to the first and second coil, said lateral dimension extending between the winding heads. Specifically, the lateral dimension may be measured along a lateral axis as discussed above which preferably extends orthogonally to the longitudinal axis. When considering practically relevant dimensions of the coils, this may have no significant effect on the properties of the coils e.g. in terms of induced currents. Yet, one could also try to compensate for this limited dimension by adapting other measurements and/or properties of the third coil accordingly. For doing so, the conductor (e.g. its diameter) of the third coil and/or a longitudinal dimension along the longitudinal axis may be adjusted and in particular increased.

Alternatively, the first distance and the second distances may extend along an axis that is non-parallel to a plane in which at least one of the coils is formed. In particular, the first and second distances may extend along a vertical axis. For example, the conductor sections of the first to third coil may be arranged on top of or, differently put, above one another within the winding head. Yet, they may be spaced apart from one another by different distances. In particular, two of the coils (first and second) may be arranged close to one another, whereas the remaining (third) coil may be arranged at a greater (second) distance thereto. This way, electromagnetic interactions between this third coil and any of the first and second coil can be limited.

As noted above, the first distance and the second distances may thus generally be vertical distances, i.e. they may be measured along a vertical axis.

According to a further embodiment of the arrangements and methods, within each winding head, a magnetisable material is arranged between the conductor section of the third coil and a conductor section of one of the first and second coil. Specifically, the magnetisable material may be arranged between the third coil and a respectively adjacent one of the first and second coil. For doing so, the increased distance of the third coil to the remaining coils is particularly beneficial.

In general, the magnetisable material allows for guiding an electromagnetic field and, more precisely, the magnetic flux of adjacent coils in a desired manner, since it is not fully permeable for the magnetic flux. Instead, the magnetic flux may at least partially be guided in the direction of the magnetisable material. Therefore, the magnetisable material may help to concentrate the magnetic flux close to each coil and thus magnetically shield the adjacent coils from one another. Preferably, this is done in such a manner so that closed and/or short magnetic field lines are formed. Also, the magnetisable material may avoid or at least limit that the magnetic fields of adjacent coils cross each other, e.g. by guiding the magnetic flux and in particular magnetic field lines of each electromagnetic field accordingly.

In one example of the arrangements and methods, the magnetisable material is arranged, so that the formation of closed magnetic field lines around the third coil is promoted. Additionally or alternatively, the magnetisable material may be arranged, so that the formation of closed field lines of the first and/or second coil is promoted. For doing so, the magnetisable material may form a projection that extends in between the third and at least one of the first and social second coil. Said projection may e.g. project in the direction of the lateral axis and/or extend along the longitudinal axis with a defined length (e.g. at least half of the length of the winding head). Generally, the magnetisable material may, within the winding head, surround the third coil and/or at least one and preferably both of the first and second coil on at least two sides and preferably on three sides.

In general, the magnetisable material may have small electric conductibility and may e.g. be a ferrite. As a result, the effects of electric currents which are induced in the shielding material are reduced.

More generally speaking, the magnetisable material may be ferromagnetic, paramagnetic or ferrimagnetic. It is preferred that the magnetisable material has a magnetic susceptibility of at least 10, preferably at least 50.

In a further embodiment of the arrangements and methods, the magnetisable material is arranged between the respective conductor sections when viewed along an axis that is non-parallel to a plane in which at least one of the coils is formed.

As noted above, according to embodiments of the arrangements and methods, the magnetisable material is formed as a projection. Said projection may at least partially extend (or, more specifically, may project in a direction that is) in parallel to a plane in which at least one of the coils are formed. For example, the projection may horizontally project into the space formed between the third and at least one of the first and second coil.

According to one aspect of the arrangements and methods, the magnetisable material is part of a shielding assembly that extends along each winding head. The shielding assembly may generally be configured to shield the surroundings from the electromagnetic field produced by the conductor arrangement. Examples of respective shielding assemblies can e.g. be found in the applicant's earlier disclosure EP 2 841 293 B1. This aspect may be beneficial in terms of costs since the magnetisable material extending between the conductor sections can directly be arranged at and/or be formed as part of the shielding assembly. Hence, no additional carrying members of fixtures are required for positioning said magnetisable material in the desired manner.

In order to further limit production costs, it may be preferable to provide a one-piece design in which the magnetisable material (e.g. the projection) that is arranged between the conductor sections in the above described manner forms part of a larger piece of the shielding assembly. For example, it may project from an elongated shielding member extending e.g. longitudinally along the winding head. The elongated shielding member may, apart from the material arranged between the conductor sections, have a C-, U- or L-shaped cross-section, so as to cover outer and/or upper portions of the conductor arrangement as well as a lateral face thereof.

Additionally or alternatively, within each winding head, a magnetisable material may be placed opposite a side of the conductor section of the third coil, said side facing away from the first and second coil. Differently put, a side of the conductor section of the third winding within each winding head facing the exterior and in particular the other of a primary or secondary side may be covered and/or shielded by a respective magnetisable material. Also, with respect to a vertical axis, said magnetisable material may be positioned beneath the conductor sections of the third coil. Still further, a respective magnetisable material may be positioned vertically above the first and/or second coil. Each of these materials above and beneath the coils may be connected to one another by a further portion of magnetisable material, thereby forming an overall C-profile.

This can be done by a preferably horizontal projection of such a material which, in case a respective material is also positioned between the conductor sections in the above noted manner, may extend in parallel to said respective material. A respective material may form a horizontal leg of a cross-sectional profile of the shielding assembly, e.g. the lower leg of a respective C-profile or E-profile. Note that an E-profile may be achieved when providing magnetisable material between the conductor sections in the above described manner, wherein said material forms the middle leg or middle projection of said E-profile. As, some general aspect, the shielding assembly may have in E-cross-sectional profile.

Any of the profiles mentioned herein may be cross-sectional profiles of the shielding assembly. A plane of the cross sections may extend orthogonally to the conductor sections within the winding heads and/or orthogonally to a horizontal spatial plane.

The invention also relates to a conductor arrangement comprising at least three coils that are arranged along a longitudinal axis and that are formed of at least one conductor, wherein the conductor arrangement comprises at least two winding heads that are arranged opposite to one another and in which conductor sections of each of the coils extend along one another as well as along the longitudinal axis, and wherein a magnetisable material is placed between at least two of the conductor sections within at least one of the winding heads.

This conductor arrangement may comprise any of the above or below discussed features, embodiments and aspects discussed with respect to the conductor arrangement comprising the first and second distances. Specifically, any definitions, explanations, embodiments and variants discussed above with respect to similarly termed features may also apply to the present conductor arrangement comprising the magnetisable material.

Specifically, the magnetisable material may be placed between the conductor section of a third coil as discussed above (e.g. a coil that is arranged between the further coils along the longitudinal axis) as well as one of a first and second coil. Also, the magnetisable material may be formed as a e.g. horizontal projection. Yet, a difference is that contrary to the conductor arrangement comprising the first and second distance, such an unequal spacing of the conductor sections within the winding heads is not mandatory. Instead, it has been determined that even in case of an equal or generally different spacing of the conductor sections, the advantages of the invention can at least partially be achieved when arranging a magnetisable material in between (e.g. vertically in between) at least two of the conductor sections, and in particular between those segments that extend along the longitudinal axis.

The invention further relates to an inductive power transfer arrangement comprising a primary side configured to produce an electromagnetic field and a secondary side configured to receive the electromagnetic field, thereby producing a magnetic induction at the secondary side, wherein at least one of the primary and secondary side comprises a conductor arrangement according to any of the previous claims. The primary and secondary side may generally be configured according to any of the above and below discussed examples. For example, the primary side may be stationary and e.g. provided in the surroundings, whereas the secondary side may be movable and e.g. provided onboard a vehicle. It should be noted that as a general aspect of the invention, the conductor arrangement disclosed herein can be used at any of the primary and secondary side, whereas limiting electromagnetic interactions between the coils may be particularly beneficial at the secondary side.

To sum up, the secondary side may be arranged onboard a land vehicle and the primary side may be arranged in the surroundings of the land vehicle (e.g. on the ground on which the land vehicle moves).

The invention also relates to a method for providing a conductor arrangement for an inductive power transfer, the method comprising forming at least three coils of a conductor arrangement, such that the coils are arranged along a longitudinal axis, and
such that at least two winding heads are formed that are arranged opposite to one another and in which conductor sections of each of the coils extend along one another as well as along the longitudinal axis, and
such that, within at least one of the two winding head, the conductor sections of a first and second coil that extend along the longitudinal axis are arranged at a first distance to one another, the first distance being equal to or larger than zero, and the conductor section of the third coil that extends along the longitudinal axis is arranged at second distances to the further conductor sections (i.e. of the first and second coil), the second distances being larger than the first distance.

The invention also relates to a method for providing a conductor arrangement for an inductive power transfer, the method comprising forming at least three coils of a conductor arrangement, such that the coils are arranged along a longitudinal axis,
such that at least two winding heads are formed that are arranged opposite to one another and in which conductor sections of each of the coils extend along one another as well as along the longitudinal axis, and such that a magnetisable material is placed between at least two of the conductor sections (that e.g. extend along the longitudinal axis) within at least one of the winding heads.

The methods may comprise any further step, any development or any further feature in order to provide any of the previously and subsequently discussed interactions, operating states and functions. Specifically, any of the previous and subsequent explanations and developments regarding the arrangement-features may also apply to the equivalent method-features. In general, the methods may be realised and/or carried out with an arrangement according to any of the previous and subsequent examples.

In the following, an embodiment of the invention will be described with reference to the attached schematic figures. Features which correspond to one another with regard to their type and/or function may be assigned the same reference signs throughout the figures. In the figures.

Figure 1:
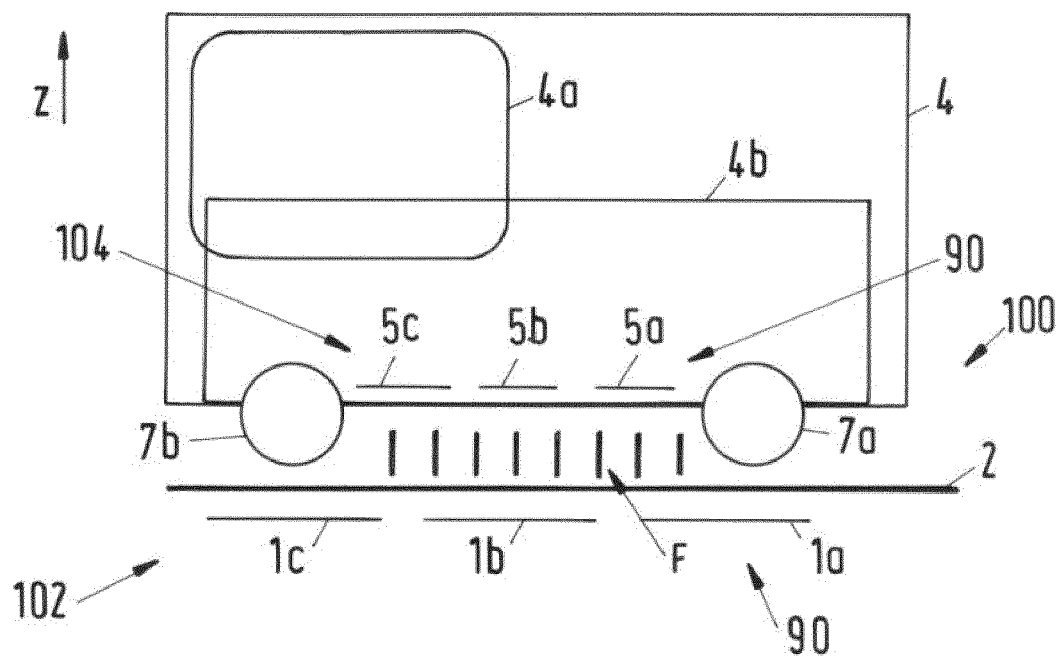
FIG. 1 is a schematic illustration of an inductive power transfer arrangement according to an embodiment of the invention.

In FIG. 1, an inductive power transfer arrangement 100 according to an embodiment of the invention is schematically shown. The inductive power transfer arrangement 100 is configured to inductively charge an electric vehicle 4. The vehicle 4 comprises wheels 7a, 7b for traveling on a track 2. For example, the vehicle 4 may be a road automobile (such as a private automobile or a bus) or may be a track bound vehicle, such as a rail vehicle. Details of the road or railway are not shown in FIG. 1.

There is an arrangement of electrically conducting material combined with (e.g. embedded in) the track 2. For example, there are three phase conductors 1a, 1b, 1c for carrying the three phases of a three-phase alternating current during operation. The phase conductors 1a, 1b, 1c form a conductor arrangement 90 in which each of the phase conductors 1a, 1b, 1c is a coil 92, 94 (see following discussion of FIG. 2).

Together with the electrically conducting material which is embedded in the track or is part of the track 2, said conductor arrangement 90 forms a primary side 102 of the inductive power transfer arrangement 100 or, differently put, forms a primary side conductor assembly. During operation, the primary side 102 produces an electromagnetic field. The magnetic field lines F are schematically indicated in FIG. 1. However, the field lines F are not completely shown. Rather, only the nearly homogeneous area of the magnetic field in the gap between the primary side 102 and the secondary side 104 of the power transfer arrangement 100 on-board the vehicle 4 is illustrated by flux lines.

The vehicle 4 comprises a receiver 4b for receiving the electromagnetic field and for producing electric energy by magnetic induction. For this purpose, the receiver 4b comprises a secondary side 104 or, differently put, a secondary side conductor assembly of the arrangement 100. In the specific embodiment shown, this secondary side 104 comprises three phase lines 5a, 5b, 5c for producing a three-phase alternating current. The phase lines 5a, 5b, 5c may be coils comprising several windings of an elongated electric conductor and thus represent coils 92, 94 of a conductor arrangement 90 discussed above. Optionally, each phase line 5a, 5b, 5c may comprise or, more precisely, be formed into a plurality of coils.

FIG. 1 also schematically shows an energy storage 4a for storing the electric energy which is produced by the receiver 4b. Other electric and/or electronic parts on board the vehicle 4, which may be used for providing the produced electric energy to any electric consumer, are not shown in FIG. 1.

Figure 2:
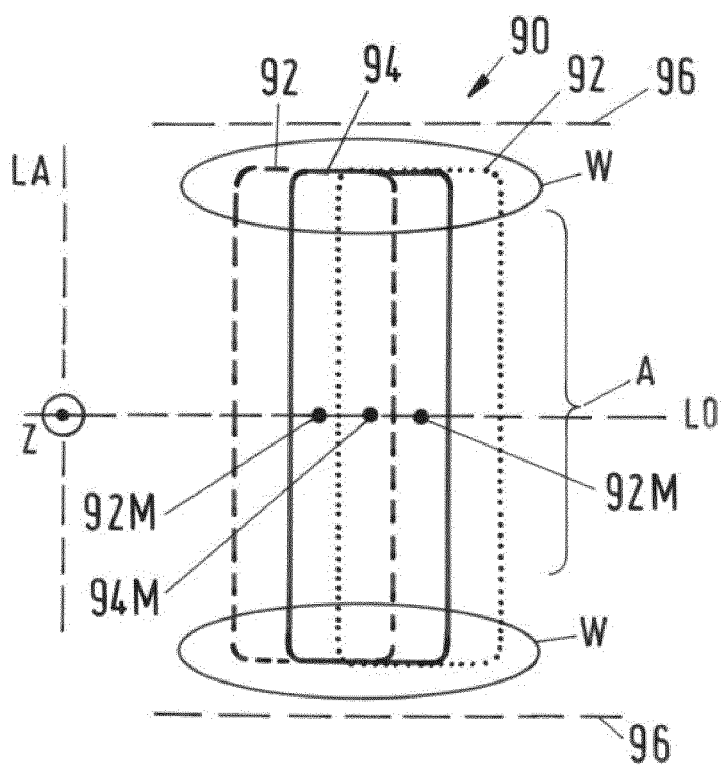
FIG. 2 is a schematic illustration of a secondary side or the arrangement of FIG. 1.

FIG. 2 schematically shows a top view or a bottom view of the primary side 102 or secondary side 104 of the inductive power transfer arrangement 100 of FIG. 1. In particular, it shows a top or bottom view of the conductor arrangement 90 at the respective primary or secondary side 102, 104. The direction which connects the primary side and the secondary side (i.e. the direction of the magnetic flux F extending therebetween as indicated in FIG. 1) extends perpendicular to the image plane of FIG. 2. Also, in FIG. 1 the outer members 5c, 5a and 1c, 1a of the respective conductor arrangements 90 correspond to the outer coils 92 of FIG. 2, whereas the central members 5b, 1b correspond to the central coil 94 of FIG. 2.

In FIG. 2, a longitudinal axis LO is indicated. Said axis LO would extend from left to right in FIG. 1 e.g. in parallel to the tracks 2. Also, a lateral axis LA is shown which extends orthogonally to the longitudinal axis LO. In FIG. 1, the lateral axis LA would extend orthogonally to the plane of this figure and e.g. towards the viewer. The lateral and longitudinal axes LA, LO extend within or define a horizontal plane. Note that said horizontal plane is equivalent to a plane in which at least the active sections A of the coils 92, 94 are formed. As noted above, this may be considered as a (main) plane in which the coils 92, 94 are formed. Further, a vertical spatial axis Z extends orthogonally to both of the lateral and longitudinal axes LA, LO and faces the viewer in FIG. 2. Note that in FIG. 1, the orientation of the vertical axis Z is depicted as well.

The coils 92, 94 are each marked by a distinct line. Specifically, the outer coils 92 are marked by a dotted and dashed line, whereas the central coil 94 is marked by a continuous line. It can be seen that each coil is formed as an oval or rectangularly shaped closed electric conductor arrangement, said conductor being a cable. The coils 92, 94 are similarly shaped and sized but not congruently arranged. Instead, they are shifted relative to one another along the longitudinal axis LO but arranged at same height along the lateral axis LA.

Each coil 92, 94 comprises two longer conductor sections extending along the lateral axis LA and two shorter conductor sections extending along the longitudinal axis LO, each of the respective pairs of conductor sections being parallel as well as opposite to one another. The conductor sections extending along the lateral axis LA each form active sections A of a respective coil 92, 94 and thus of the overall conductor arrangement. The conductor sections extending along the longitudinal axis LO form two opposite winding heads W that connect the active sections A. Specifically, the active sections A are spaced apart from one another along the longitudinal axis LO. Yet, they are connected by the conductor sections of the winding heads. Due to bridging the longitudinal gap between the active sections A, the winding heads' conductor sections extend along the longitudinal axis LO, even though they could be curved in case of oval windings. For illustrative purposes, a comparatively large area of the winding heads W is encircled in FIG. 2. Yet, in a strict sense, only the area in which the short conductor sections of each three coils 92, 94 extend along one another could be considered to represent an actual winding heads W. This would be equivalent to the area of the short longitudinal conductor sections of the central coils 94 in each of said encircled areas. Note that only those conductor sections extending along the longitudinal axis LO are referenced as "conductor sections within/of the winding head" or similar in the context of the embodiments.

Accordingly, in the example of FIG. 2, the coils 92, 94 are arranged at same positions (i.e. heights) along the lateral axis LA. However, they are arranged sequentially and in particular next to one another along the longitudinal axis LO.

In more detail, for each of the coils 92, 94, a geometric centre 92M, 94M is shown or, in other words, a centre of area of the coils 92, 94 (i.e. a centre of the area enclosed by the coils 92, 94). It can be seen that the central coil 94 is, especially with respect to its geometric centre 94M, arranged between the outer coils 92 along the longitudinal axis LO (and in particular between the geometric centres 92M of these outer coils 92).

Accordingly, the coils 92, 94 and especially their geometric centres 92M, 94M are spaced apart from one another or, differently put, displaced along the longitudinal axis relative to one another by equal distances (e.g. a third of a longitudinal dimension (i.e. width) of each coil 92, 94).

As a general result of the conductor arrangement depicted in FIG. 2, each coil 92, 94 forms a coil that may produce a different phase of a three-phase alternating current or may carry one phase of a three-phase alternating current during operation, depending on which of the primary or secondary side 102, 104 is considered.

Still further, in FIG. 2, a shielding assembly 96 is indicated which is made of a magnetic material. As will be evident from the following figures, said shielding assembly 96 may (with respect to the axis Z) also cover at least part of the winding heads W or extend below thereof. Also, even though the shielding assembly 96 is only depicted as extending outside of and along the winding heads W, it may also fully enclose the conductor arrangement 90 on all sides. For example, it may have an overall rectangular outline due to connecting the depicted longitudinal sections in FIG. 2 by additional lateral sections (not shown). Also, at least part of the shielding assembly 96 may extend along a side of a conductor arrangement 90 facing away from the further conductor arrangement 90 at a respective other of the primary or secondary side 102, 104. Examples of shielding assemblies 96 can be found in the above-mentioned earlier disclosure EP 2 841 293 B1.

In the following, cross sections through conductor arrangements 90 according to embodiments of the invention will be discussed. A plane of the cross sections contains or extends in parallel to the lateral axis LA as well as the vertical axis Z. Also, the cross sections only depict one of the winding heads W. Yet, it is to be understood that the respectively opposite winding head W is configured in a similar manner. This is indicated by axes of symmetry S in the following figures at which depicted members and components are mirrored. Still further, the following cross-sections relate to a secondary side 104 but the primary side 102 can be configured in an identical manner (e.g. by simply turning the depicted conductor arrangements 90 upside down).

Figure 3:
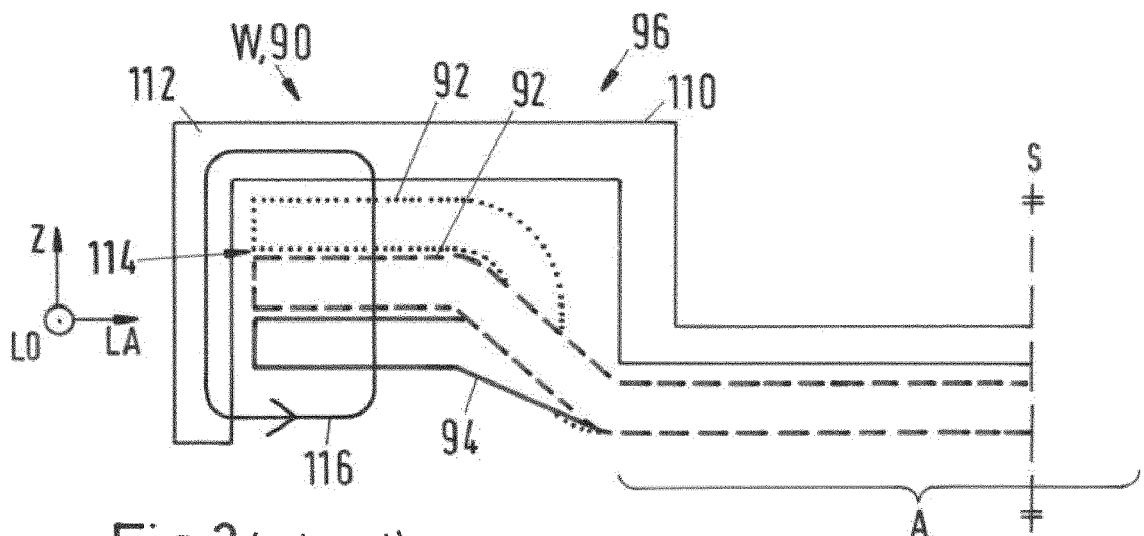
FIG. 3 is a detailed view of the winding head of a secondary side according to the prior art.

First of all, however, an example of a prior art solution is shown in FIG. 3. More precisely, a cross-section of a winding head W of a prior art conductor arrangement 90 is shown. The different coils 92, 94 are represented by similar line-types as in FIG. 2 (i.e. dotted, dashed, continuous lines). A part of the active section A of the coils 92, 94 can be seen. In the region of the winding head W, the conductor sections of the coils 92, 94 are angled with respect to said active section A and extend into the plane of FIG. 3 towards the opposite active section A (i.e. point away from the viewer).

In a generally known manner, the conductor sections of each coil 92, 94 are vertically placed on top of one another or, in other words, are vertically stacked (see respective vertical axis Z). Adjacent conductor sections within the winding head W are thus vertically spaced apart from one another. This spacing is regular, i.e. the conductor sections have the same vertical distance to a respective directly adjacent conductor section. Also said distance is comparatively small (e.g. few centimeters) or non-existent in case of a contact between adjacent conductor sections. If no contact is desired, spacers of e.g. plastic or other electrically isolating material can be arranged between adjacent conductor sections.

Moreover, a shielding assembly 96 comprising magnetisable material 110 is shown. The shielding assembly 96 covers a (vertically) upper side of the conductor arrangement 90. Close to a lateral edge, it has an enlarged angled portion 112 for receiving the winding head W. Note that the shielding assembly 96 also covers a lateral outer edge or, differently put, a lateral face 114 of the winding head W.

FIG. 3 also indicates a main course of resulting magnetic field lines 116 in the region of the winding head W, said field lines 116 occurring when operating the conductor arrangement 90 (i.e. when inductively transferring electrical energy thereto). Due to the shape of the shielding assembly 96, a large portion of the produced electromagnetic flux does not enter the surroundings but follows the shape of the shielding assembly 96. Specifically, after leaving the winding head W in a vertically upward direction, the field lines 116 are guided back towards a lower portion of the winding head W through the portion of this shielding assembly 96 that covers the lateral face 114 of the winding head W. This way, a closed circle of the magnetic field lines 116 is produced.

However, the inventors have observed that these field lines 116 extend through all conductor sections that are present in the winding head W and thus through all of the coils 92, 94. As a result, the electromagnetic interactions between the coils 92, 94 will be strong, while these coils 92, 94 are actually supposed to produce independent phases of an alternating current. This concerns in particular the central coil 94 which, due to being positioned between the outer coils 92, already experiences strong electromagnetic interactions in the region of its active sections A.

The invention seeks to overcome these problems by electromagnetically decoupling at least some of the coils 92, 94 and e.g. according to the following embodiments.

Figure 4:
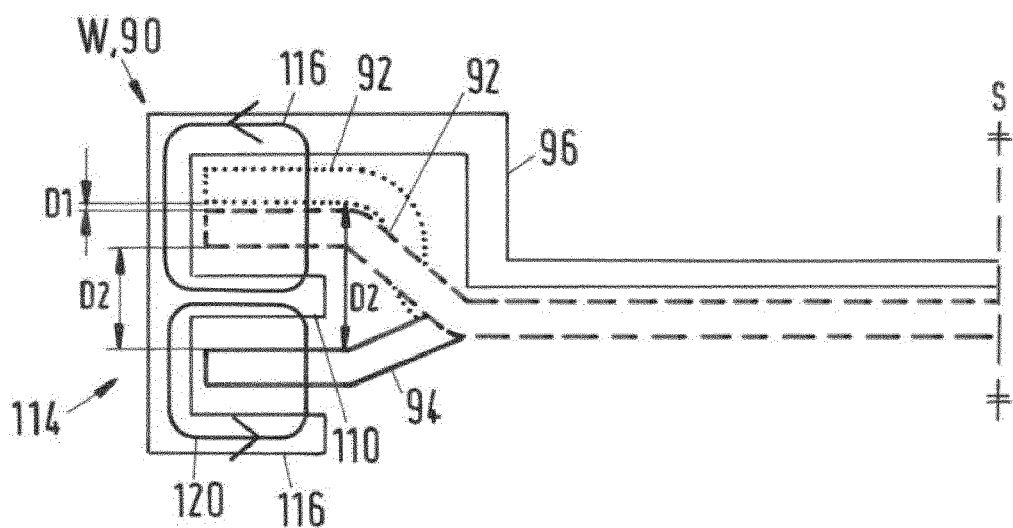
FIG. 4 is a detailed view of the winding head of a secondary side according FIG. 2.

In FIG. 4, a similar cross-section as in FIG. 3 is shown. Yet, in this case, only the conductor sections of the outer coils 92 are positioned close to one another within the winding head W. Specifically, they are positioned at a comparatively small distance D1 relative to one another, which may amount to a few centimetres (e.g. less then 5 cm) or may even be zero. On the other hand, the conductor section of the central coil 94 is, within the winding head W, positioned at larger distances D2 to each of the conductor sections of the outer coils 92. Note that the distances D2 are of course different from one another but are labelled similarly to indicate that these both relate to distances of the central coil's conductor section to the further conductor sections. Still further, the distances D1, D2 are vertical distances as evident from the coordinate system in FIG. 3 which is also valid for each of the further FIGS. 4 to 6.

Accordingly, within the winding head W the conductor sections of the outer coils 92 are positioned closer to one another (distance D1) than to the conductor section of the central coil 94 (distance D2). Due to the resulting air gap between the outer coils 92 and the central coil 94, electromagnetic interactions between these coils 92, 94 and in particular and undesired influence of the outer coils 92 on the central coil 94 can be limited.

Therefore, adjusting the distances between the coils 92, 94 as depicted in FIG. 3 represents an embodiment of the invention as such, regardless of the below discussed further features of the shielding assembly 96.

Nonetheless, a further advantageous embodiment is provided by the depicted design of the shielding assembly 96 and specifically by a portion of magnetisable material 110 extending in between the conductor sections in the winding head W.

In more detail, FIG. 3 shows that the shielding assembly 96 again has a portion covering the lateral face 114 of the conductor sections within the winding head W. Yet, at a position between the conductor sections of the outer coils 92 and the conductor section of the central coil 94, a projection of magnetisable material 110 is formed which projects horizontally (i.e. along the lateral axis LA, see FIG. 3) and extends along the length of the winding head W (i.e. along the longitudinal axis LO, see FIG. 3). Said projection of magnetisable material 110 thus extends into the air gap formed by the increased distance D2 between the outer and central coils 92, 94. When viewed along the vertical axis Z, said projecting magnetisable material 110 is thus positioned in between the conductor sections of the outer coils 92 and the central coil 94.

Figure 5:
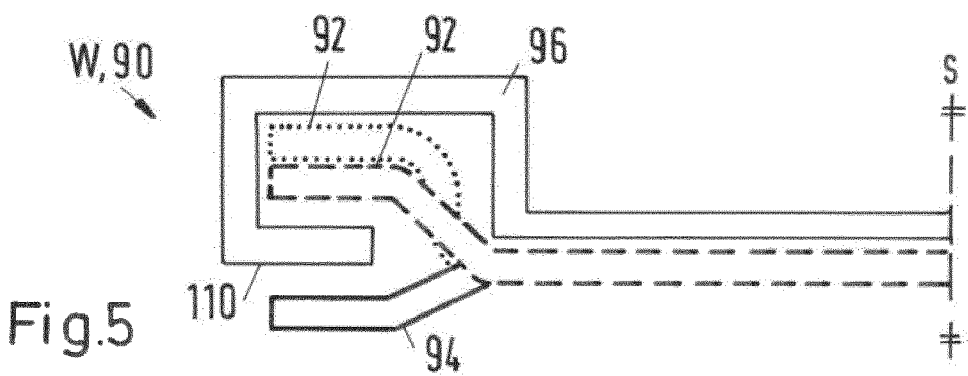
FIG. 5 is a detailed view of a winding head of a secondary side according to a further embodiment of the invention.

It is evident from the below FIG. 5, that providing a respective protection of magnetisable material 110 represents an embodiment of the invention by itself. This feature may help to limit electromagnetic interactions in particular between the outer coils 92 and the central coil 94 by shielding these coils 92, 94 from one another within the winding head W. Specifically, as discussed in the following with respect to FIG. 4, it helps to concentrate the magnetic field lines 116 of each of the outer coils 92 and central coil 94 close to the respective coils 92, 94. With respect to the central coil 94, however, this may be achieved to a lesser extent compared to the embodiment of FIG. 4 due to the shielding assembly 96 not covering a lateral face and underside of said central coil 94.

Coming back to FIG. 4, it can be seen that the shielding assembly 96 also covers the lateral face 114 of the central coil 94 and comprises a further horizontal projection 120 of magnetisable material 110 that extends parallel to the horizontal projection in between the coils 92, 94. Thus, the lateral angled portion of the shielding assembly 96 or, in general, the portion of the shielding assembly 96 shielding (or surrounding) the winding head W has an E-shaped cross-section. Depending on the exact configuration, the legs of said E-shaped cross-section may have different lengths. For example, in FIG. 4 the upper leg is longer than the central and lower leg formed by the respective projections of magnetisable material 110.

Each of the lateral faces 114 of the outer coils 92 and the central coil 94 is, within the winding W, thus partially surrounded by the shielding assembly 96 and, more specifically, surrounded on three sides. This helps to concentrate the electromagnetic fields produced by these coils 92, 94 close thereto. More precisely and as depicted in FIG. 4, a large portion of the magnetic field lines 116 can be guided by the shielding assembly 96 and in particular with help of the horizontal projection in between the conductor sections, so as to produce closed circles of respective field lines 116. In particular, it can be avoided that a large portion of the field lines 116 of the outer coils 92 extend through the central coil 94, thus limiting the electromagnetic interactions between these coils 92, 94.

Figure 6:
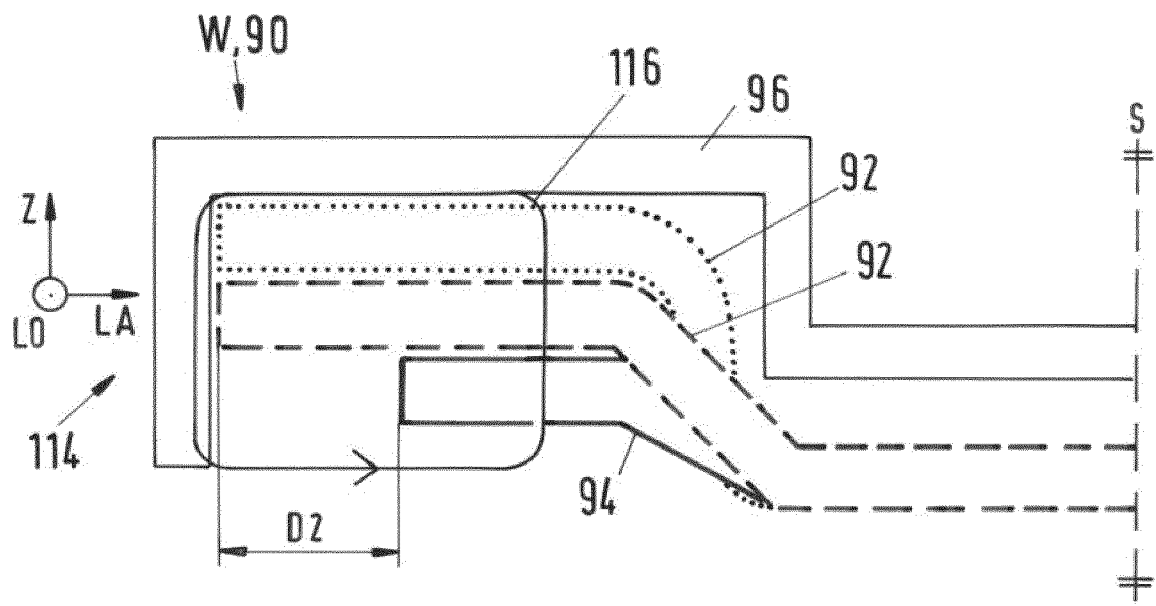
FIG. 6 is a detailed view of a winding head of a secondary side according to a still further embodiment of the invention.

A further embodiment of the invention is shown in FIG. 6. In this case, the conductor sections within the winding head W are not vertically but horizontally spaced apart and, more precisely, spaced apart along the lateral axis LA (i.e. within a plane in which at least the active sections of the coils 92, 94 are formed). Specifically, the conductor section of the central coil 94 is spaced apart from the conductor sections of the outer coils 92 along the lateral axis LA by the distance D2 depicted in FIG. 6. This distance relates in particular to the lateral faces 114 of these conductor sections or, in other words, as measured between these lateral faces 114. The vertical distances between the conductor sections, on the other hand, can be regular, much like of the equidistant spacing according to FIG. 3). This limits in particular the vertical size of the winding head W. Yet, the vertical distances could also be configured according to the embodiments of FIGS. 4 and 5 to achieve a particularly strong electromagnetic decoupling between the outer and central coils 92, 94 within the winding head W.

Note that the horizontal/lateral distance between the conductor sections of the outer coils 92 is zero in FIG. 6. A respective first distance D1 between these conductor sections is thus not depicted in FIG. 6. Also, the horizontal/lateral second distances D2 between the central coil and outer coils 94, 92 is equivalent with regard to both of these outer coils 92. In the wording of the present claims, the second distances D2 of the central coil 94 to each of the further conductor sections of the outer coils 92 are thus equivalent to one another.

The shielding assembly 96, on the other hand, is configured similar to the example of FIG. 3. This also means that the magnetic field lines 116 are guided in a similar manner through all of the conductor sections within the winding head W. However, due to the distance D2, a (horizontal) length of said field lines 116 is increased. This means that the magnetic flux is weakened in particular in the region of the air gap formed by the horizontal distance D2. Again, this leads to limited electromagnetic interactions between the coils 92, 94 and in particular a limited influence of the outer coils 92 on the central coil 94.

Figure 7:
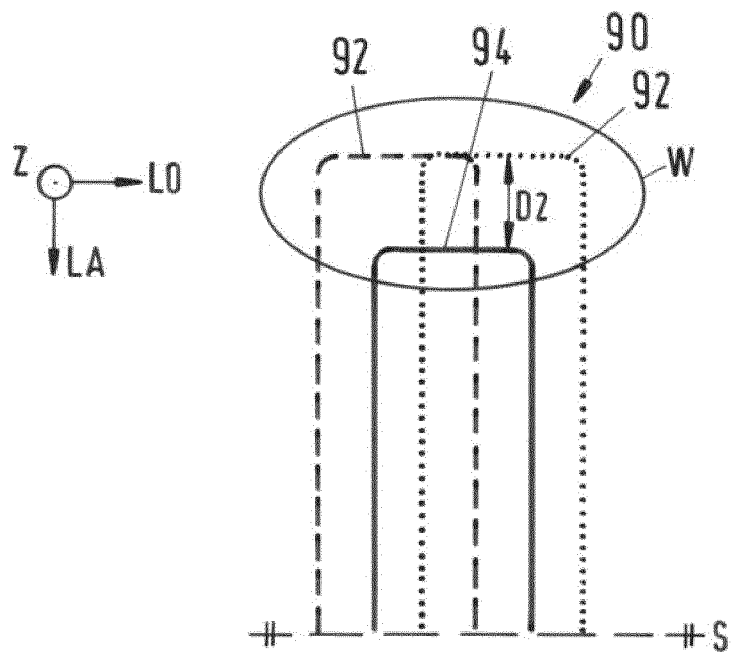
FIG. 7 is a top view of part of the embodiment of FIG. 6.

In FIG. 7, a top view of the conductor arrangement 90 of FIG. 6 without the shielding assembly 96 is shown. Again, the horizontal displacement of the central coil 94 with respect to the outer coils 92 can be seen. Note that the term "outer" relates to the position of said coils 92 along the longitudinal axis LO. As evident from the depicted axis of symmetry S, a lateral dimension of the central coil 94 is thus reduced compared to the outer coils 92. This, however, has no significant effect on the properties of the coils 92, 94 when considering practically relevant dimensions (e.g. much larger dimensions along longitudinal axis than depicted). Thus, in said coils 92, 94 comparable currents are still induced when exposed to an electromagnetic field.

The invention claimed is:

1. A conductor arrangement for an inductive power transfer, the conductor arrangement comprising at least three coils that are arranged along a longitudinal axis and that are formed of at least one conductor,
wherein the conductor arrangement comprises at least two winding heads that are arranged opposite to one another along a lateral axis perpendicular to the longitudinal axis and in which conductor sections of each of the coils extend along one another as well as along the longitudinal axis,
wherein, within at least one of the two winding heads and at a location where the at least three coils extend alongside one another, the conductor sections of a first and a second coil of the at least three coils that extend along the longitudinal axis are arranged at a first distance to one another in a first direction perpendicular to both the longitudinal axis and the lateral axis, the first distance being equal to or larger than zero, and the conductor section of a third coil of the at least three coils that extends along the longitudinal axis is arranged at second distances to said conductor sections of the first and second coils in a second direction perpendicular to both the longitudinal axis and the lateral axis, the second distances being larger than the first distance.

2. The conductor arrangement according to claim 1, wherein the third coil is arranged at least partially between the first and second coil when viewed along the longitudinal axis.

3. The conductor arrangement according to claim 1, wherein the first distance and the second distances extend along an axis that is parallel to a plane in which at least one of the coils are formed.

4. The conductor arrangement according to claim 1, wherein the first distance and the second distances are horizontal distances.

5. The conductor arrangement according to claim 3, wherein the third coil has a reduced lateral dimension compared to the first and second coil, said lateral dimension extending between the winding heads.

6. The conductor arrangement according to claim 1, wherein the first distance and the second distances extend along an axis that is non-parallel to a plane in which at least one of the coils are formed.

7. The conductor arrangement according to claim 1, wherein the first distance and the second distances are vertical distances.

8. The conductor arrangement according to claim 6, wherein, within each winding head, a magnetisable material is arranged between the conductor section of the third coil and a conductor section of one of the first and second coil.

9. The conductor arrangement according to claim 8, wherein magnetisable material is arranged between the respective conductor sections when viewed along an axis that is non-parallel to a plane in which at least one of the coils are formed.

10. The conductor arrangement according to claim 8, wherein the magnetisable material is formed as a projection extending at least partially in parallel to a plane in which at least one of the coils are formed.

11. The conductor arrangement according to claim 8, wherein the magnetisable material is part of a shielding assembly that extends along each winding head.

12. The conductor arrangement according to claim 1, wherein, within each winding head, a magnetisable material is placed opposite a side of the conductor section of the third coil, said side facing away from the first and second coil.

13. An inductive power transfer arrangement, comprising a primary side configured to produce an electromagnetic field and a secondary side configured to receive the electromagnetic field, thereby producing a magnetic induction at the secondary side,
wherein at least one of the primary and secondary sides comprises a conductor arrangement according to claim 1.

14. The inductive power transfer arrangement according to claim 13, wherein the secondary side is arranged onboard a land vehicle and the primary side is arranged in the surroundings of the land vehicle.

15. A conductor arrangement for an inductive power transfer, the conductor arrangement comprising at least three coils that are arranged along a longitudinal axis and that are formed of at least one conductor,
wherein the conductor arrangement comprises at least two winding heads that are arranged opposite to one another and in which conductor sections of each of the at least three coils extend along one another as well as along the longitudinal axis, wherein each of the winding heads includes a lateral face extending along the conductor sections,
wherein the conductor arrangement further comprises a shielding assembly made of magnetisable material, the shielding assembly covering the lateral face of at least one of the at least two winding heads and including a projection that extends inwardly relative to the conductor arrangement so as to be located between and extend along immediately adjacent ones of the conductor sections so that the magnetisable material separates, within the winding head, at least one of the conductor sections from at least two of the conductor sections.

16. The conductor arrangement according to claim 15, wherein the at least one winding head is a region in which a direction of extension of each of the at least three coils is reversed.

17. A method for providing a conductor arrangement for an inductive power transfer, comprising forming at least three coils to form a conductor arrangement and such that the coils are arranged along a longitudinal axis, and
such that at least two winding heads are formed that are arranged opposite to one another along a lateral axis perpendicular to the longitudinal axis and in which conductor sections of each of the at least three coils extend along one another as well as along the longitudinal axis, and
such that, within at least one of the two winding heads and at a location where the at least three coils extend alongside one another, the conductor sections of a first and a second coil of the at least three coils that extend along the longitudinal axis are arranged at a first distance to one another in a first direction perpendicular to both the longitudinal axis and the lateral axis, the first distance being equal to or larger than zero, and the conductor section of a third coil of the at least three coils that extends along the longitudinal axis is arranged at second distances to said conductor sections of the first and second coils in a second direction perpendicular to both the longitudinal axis and the lateral axis, the second distances being larger than the first distance.

18. A method for providing a conductor arrangement for an inductive power transfer, comprising forming at least three coils of a conductor arrangement, such that the coils are arranged along a longitudinal axis, such that at least two winding heads are formed that are arranged opposite to one another and in which conductor sections of each of the at least three coils extend along one another as well as along the longitudinal axis, wherein each of the winding heads includes a lateral face extending along the conductor sections, and such that a shielding assembly made of magnetisable material is provided, the shielding assembly covering the lateral face of at least one of the at least two winding heads and including a projection that extends inwardly relative to the conductor arrangement so as to be located between and extend along immediately adjacent ones of the conductor sections so that the magnetisable material separates, within the winding head, at least one of the conductor sections from at least two of the conductor sections.

19. The method according to claim 18, wherein the at least one winding head is a region in which a direction of extension of each of the at least three coils is reversed.

* * * * *